J. SILVER & J. WALTER.
CAR FENDER.
APPLICATION FILED AUG. 27, 1910.
1,007,395.
Patented Oct. 31, 1911.
3 SHEETS—SHEET 1.
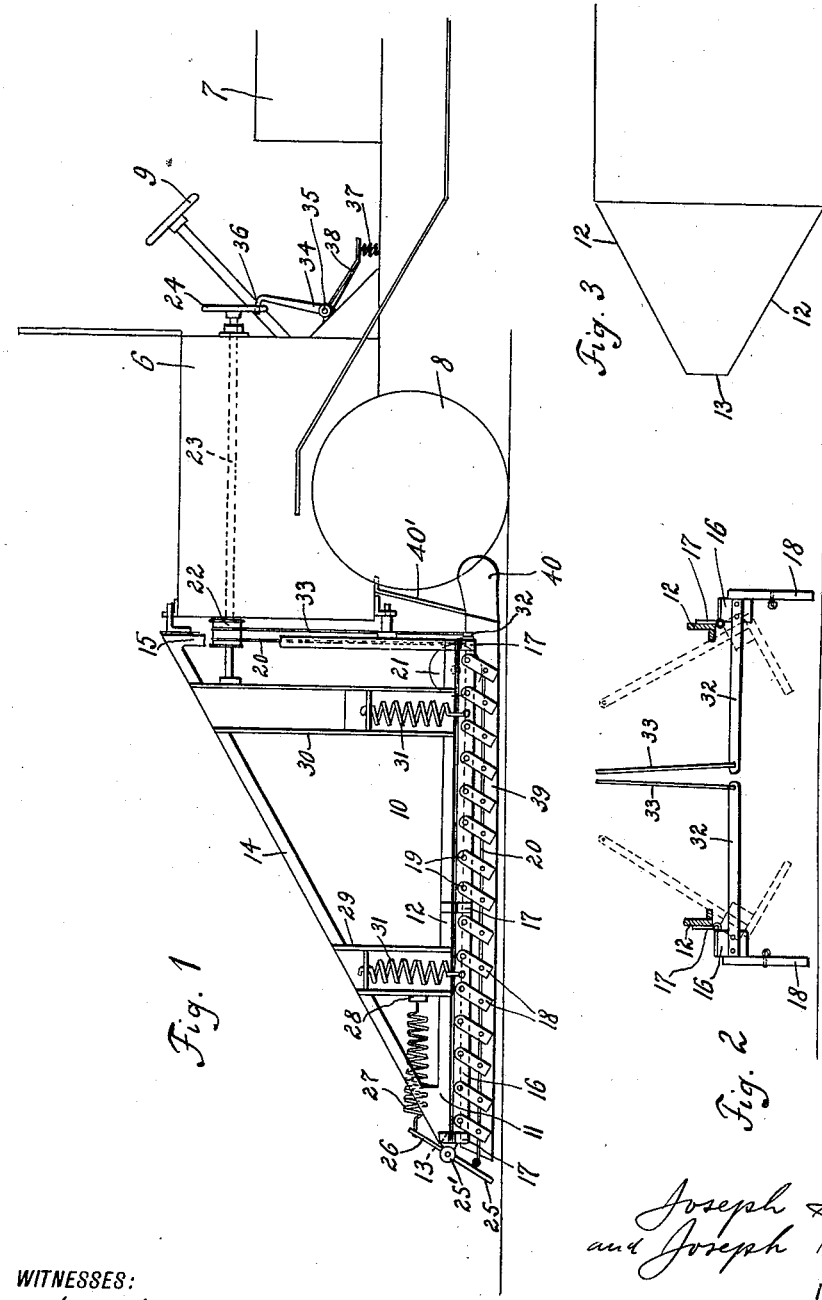

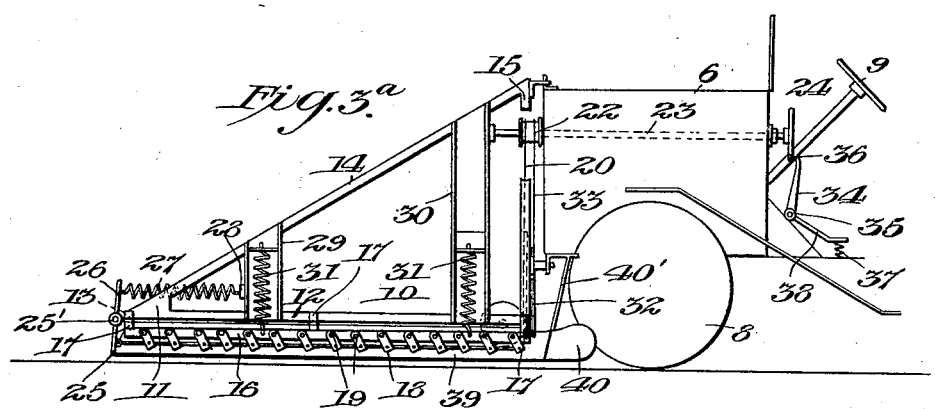

J. SILVER & J. WALTER.
CAR FENDER.
APPLICATION FILED AUG. 27, 1910.
1,007,395.
Patented Oct. 31, 1911.
3 SHEETS—SHEET 3.
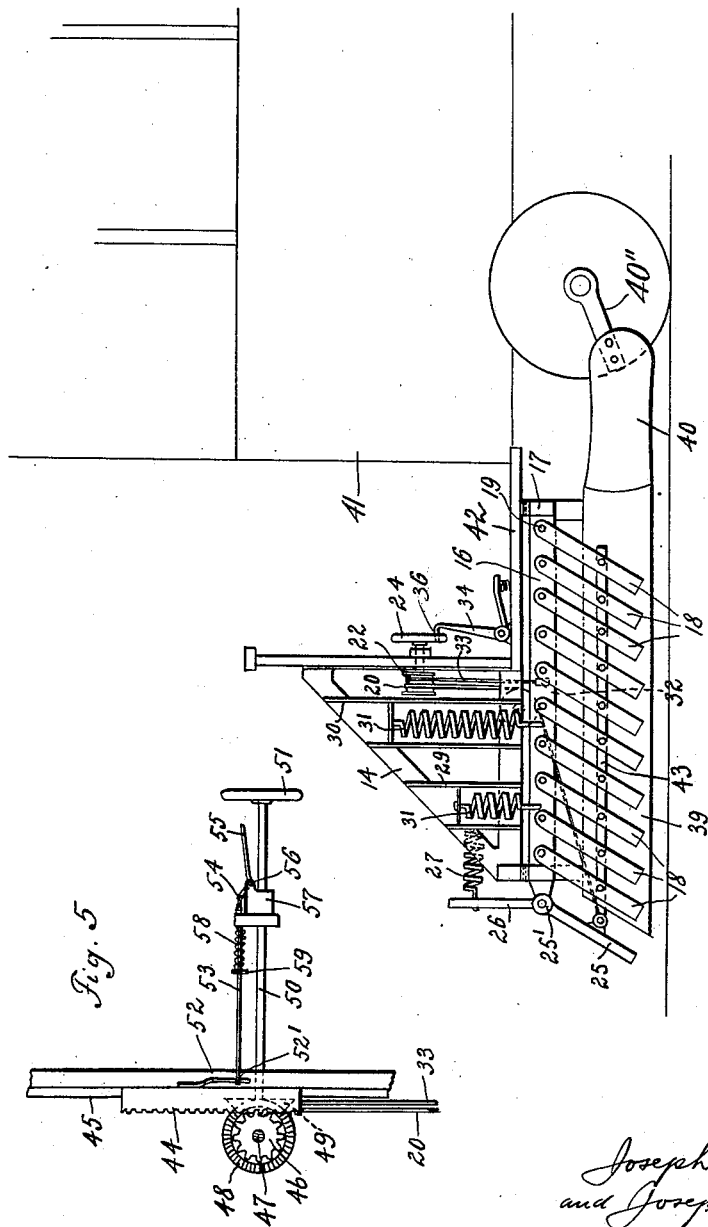

UNITED STATES PATENT OFFICE.

JOSEPH SILVER AND JOSEPH WALTER, OF NEW YORK, N. Y.

CAR-FENDER.

1,007,395.   Specification of Letters Patent.   Patented Oct. 31, 1911.

Application filed August 27, 1910. Serial No. 579,235.

*To all whom it may concern:*

Be it known that we, JOSEPH SILVER, a citizen of the United States, and JOSEPH WALTER, a subject of the King of Hungary, and residents of the city of New York, in the county of Kings and State of New York, have invented certain new and useful Improvements in Car-Fenders, of which the following is a specification.

The present invention relates to safety devices for automobiles and other cars, and has for its object the providing of a simple and efficient means for preventing injury to a person who is struck by or falls in front of the car.

With these and other objects in view, which will appear as the nature of the invention is better understood, the same consists in the construction, arrangement and combination of the parts hereinafter fully described, pointed out in the appended claims and illustrated in the accompanying drawings, it being understood that several changes may be made in the size and proportion of the several parts and minor details of construction without departing from the spirit or sacrificing any of the advantages of the invention.

A few of the many possible embodiments of the invention are illustrated in the accompanying drawings, in which:—

Figure 1 is a side elevation of the front part of an automobile provided with the attachment forming the subject matter of the present invention in its tripped and lowered position; Fig. 1ª is a front elevation of the device shown in Fig. 1; Fig. 2 is an end view of a detail of construction showing the fender slats in their tripped and lowered positions in full lines and in their locked and normal positions in dotted lines; Fig. 3 is a diagrammatic plan view of the outlines of the fender frame; Fig. 3ª is a side elevation of the front part of an automobile with the attachment in its normal raised position; Fig. 4 is a side view of a street car having the improved fender in its lowered and tripped position attached thereto; and Fig. 5 is a side elevation of a modified fender operating means.

Referring now more particularly to Figs. 1 to 3, inclusive, of the drawings, the numeral 6 indicates diagrammatically the front part of an automobile, the operator's seat being indicated at 7, one of the front wheels at 8 and the steering wheel at 9.

A metal frame 10 is, preferably, detachably secured to the frame of the automobile, and more particularly in front of the radiator. This frame comprises a V-shaped base 11 formed of, preferably, angle-irons 12, 12 and 13. The angle-irons 12, 12 form the side members and the angle-iron 13 the front member of the base. From this base extend upward in an inclined plane angle-irons 14, 14 to the top of the hood of the automobile, which angle-irons are connected with the irons 12, 12 by strips 15, 15. Below the angle-irons 12, 12 are arranged bars 16, 16, which are fastened by means of hinges 17, 17 to the base 11. These bars extend throughout the length of the angle-irons 12, 12. The fender of the device comprises a plurality of slats 18, 18, which are pivoted to the bars 16, 16 at 19, and connected near to their lower ends by means of flexible connections 20, which lead over pulleys 21 to a drum 22, which is fixedly attached to a shaft 23, suitably journaled in the fender frame and in the frame of the automobile. The inner end of this shaft is provided with a hand-wheel 24, within the reach of the operator of the automobile. Below the angle-iron 13 is also arranged a bar 25', pivoted to the base 11, and carrying slats 25, 25, which are secured at their lower ends to the flexible connections 20, 20. An arm 26 is attached to the bar 25' and engaged by a spring 27, which is attached at 28 to some stationary part of the fender frame. U-shaped channel irons 29 and 30 connect the angle-irons 14 with the angle-irons 12, 12, and in these channel irons are arranged springs 31, 31 fastened to said channel irons and to the bars 16, 16. The latter are provided with arms 32, 32, to the free ends of which are attached flexible connections 33, 33, the other ends of which are attached to the drum 22. A foot-lever 34 is pivoted at 35 to the frame of the automobile. One arm of this lever is provided with a nose 36, which is adapted to engage the spokes of the hand-wheel 24; a spring 37, bearing against the arm 38 of the lever 34, prevents an accidental disengagement of the nose 36 from the spokes of the wheel 34. Rubber strips 39, depend from the bars 16 almost to the ground. Metal wheel guards 40, 40 are arranged upon the outer side of the wheels 8, 8, and are fastened to the frame of the automobile by means of brackets 40', 40', for a purpose hereinafter to be described. The operation of this device is as follows: Under normal conditions the fender slats 18 are held in their raised positions, as shown in Fig. 3ª and in dotted lines in Fig. 2 of the drawings, and the fender slats 25 in their inner positions. To bring the slats in these positions from their positions shown in Figs. 1, 1ª and in full lines in Fig. 2, the lever 34 is disengaged from the hand-wheel 24 and the latter turned in a given direction, whereby the flexible connections 20 and 33 will be wound upon the drum 22, moving thereby first the ends of the slats 18 and 25 around their pivots 19 and the bar 25', respectively toward the automobile, and then the bars 16, with the slats attached thereto about the hinges 17, in raised positions. In releasing the pressure from the spring 37, the nose 36 of the lever 34 will engage one of the spokes of the hand-wheel 24, and thereby keep the slats in their raised position against the tension of the springs 27 and 31. When the automobile driver sees a person in dangerous proximity to the car, he depresses the foot-lever 34, whereby the springs 27 and 31 are left free to act, bringing the fender slats in their outer and lower positions almost in contact with the ground, thus preventing a body from getting under the wheels. The rubber strips 39 and the guards 40 form additional protecting devices. The fender, owing to its V-shape, will easily remove a prostrate body from the path of the car.

In Fig. 4 of the drawings the device is shown applied to a street car, which is indicated by the numeral 41. In this case a plurality of fender slats 18 is arranged under and in front of the platform 42. The slats are shown in this case connected by means of a rod 43, to which is fastened one of the flexible connections 20. The wheel guards 40, 40 are carried by brackets 40'', 40'', which are attached to some stationary part of the wheel axle. The operation of the device is otherwise in all respects the same as that shown in Figs. 1 to 3, inclusive.

Fig. 5 illustrates a modification of the fender actuating mechanism, and comprises a rack 44, to the lower end of which are fastened the flexible connections 20 and 33. The rack is slidably arranged in a guide way 45, its teeth meshing with a pinion 46, suitably journaled in the frame of the apparatus. To the shaft 47 of this pinion is fixedly secured a bevel gear 48, in mesh with a similar gear 49, which is attached to a shaft 50, the inner free end of which carries a wheel 51 within the reach of the operator. Upon the rear side of the rack 44 is arranged a leaf spring 52, having a hole 52' adapted to be engaged by a stop 53, in the form of a rod, which is pivotally attached at 54 to a releasing lever 55, fulcrumed at 56 to a bracket 57. A spring 58 bears against a disk 59, attached to the stop rod 53, and against the bracket 57, holding thereby the stop 53 in engagement with the hole 52' in the spring 52. The operation of this device is as follows: To bring the fender slats into their raised positions, the rack 44 is raised by rotating the hand-wheel 51 in a predetermined direction. As soon as the hole 52' registers with the stop rod 53, the latter will be forced by its spring 58 into engagement with said hole, holding thereby the fender slats in raised position. In order to bring the fender slats into their lower, operative position, the free end of the lever 55 is forced toward the rod 50, whereby the stop 53 is disengaged from the hole 52', thereby allowing the springs in the channel-irons 29 and 30 to act in the manner hereinbefore described.

What we claim is:

1. In a safety appliance for cars, the combination with a V-shaped frame attached to the forepart of the car having a base consisting of two side members and a front member, of bars running along the said side members and front member and being hingedly secured thereto, fender slats pivotally attached to said bars, means for simultaneously moving all of said slats around their pivots and for shifting said bars inwardly, whereby said slats are raised, a stop for holding said slats in such raised positions, and means for lowering said slats and moving the same around their pivots upon disengagement of said stop from said raising means.

2. In a safety appliance for cars, the combination with a V-shaped frame attached to the forepart of the car having a base consisting of two side members and a front member, of bars running along the said side members and front member and being hingedly secured thereto, fender slats pivotally attached to said bars, means for simultaneously moving all of said slats around their pivots and for shifting said bars inwardly, whereby said slats are raised, a stop for holding said slats in such raised positions, and a plurality of springs for lowering said slats and moving the same around their pivots upon disengagement of said stop from said raising means.

3. In a safety appliance for cars, the combination with a V-shaped frame attached to the forepart of the car having a base consisting of two side members and a front member, of bars running along the said side members and front member and being hingedly secured thereto, fender slats pivotally attached to said bars, means for simultaneously moving all of said slats around their pivots and for shifting said bars inwardly, whereby said slats are raised, a stop for holding said slats in such raised positions, and a plurality of springs attached to said frame and said bars for lowering said slats and moving the same around their pivots upon disengagement of said stop from said raising means.

4. In a safety appliance for cars, the combination with a V-shaped frame attached to the forepart of the car having a base consisting of two side members and a front member, of bars running along the said side members and front member and being hingedly secured thereto, fender slats pivotally attached to said bars, a shaft rotatably mounted on said car, a hand-wheel upon the inner end thereof, a drum fixedly attached to said shaft, flexible connections between said drum and said bars, flexible connections between all of said slats and said drum, whereby upon rotating said shaft said slats are moved around their pivots and said bars around their hinges bringing thereby said slats into their raised positions, a lever engaging said hand-wheel for holding said slats in their raised positions, and a plurality of springs for lowering said slats and moving the same around their pivots upon disengagement of said stop from said hand-wheel.

5. In a safety appliance for cars, the combination with a V-shaped frame attached to the forepart of the car having a base consisting of two side members and a front member, of bars running along the said side members and front member and being hingedly secured thereto, fender slats pivotally attached to said bars, a shaft rotatably mounted on said car, a hand-wheel upon the inner end thereof, a drum fixedly attached to said shaft, flexible connections between said drum and said bars, flexible connections between all of said slats and said drum, whereby upon rotating said shaft said slats are moved around their pivots and said bars around their hinges bringing thereby said slats into their raised positions, a lever engaging said hand-wheel for holding said slats in their raised positions, and a plurality of springs attached to said frame and said bars for lowering said slats and moving the same around their pivots upon disengagement of said stop from said hand-wheel.

Signed at New York, in the county of New York and State of New York, this 18th day of August, A. D. 1910.

JOSEPH SILVER.
JOSEPH WALTER.

Witnesses:
SIGMUND HERZOG,
S. BIRNBAUM.

Copies of this patent may be obtained for five cents each, by addressing the "Commissioner of Patents Washington, D. C."